UNITED STATES PATENT OFFICE.

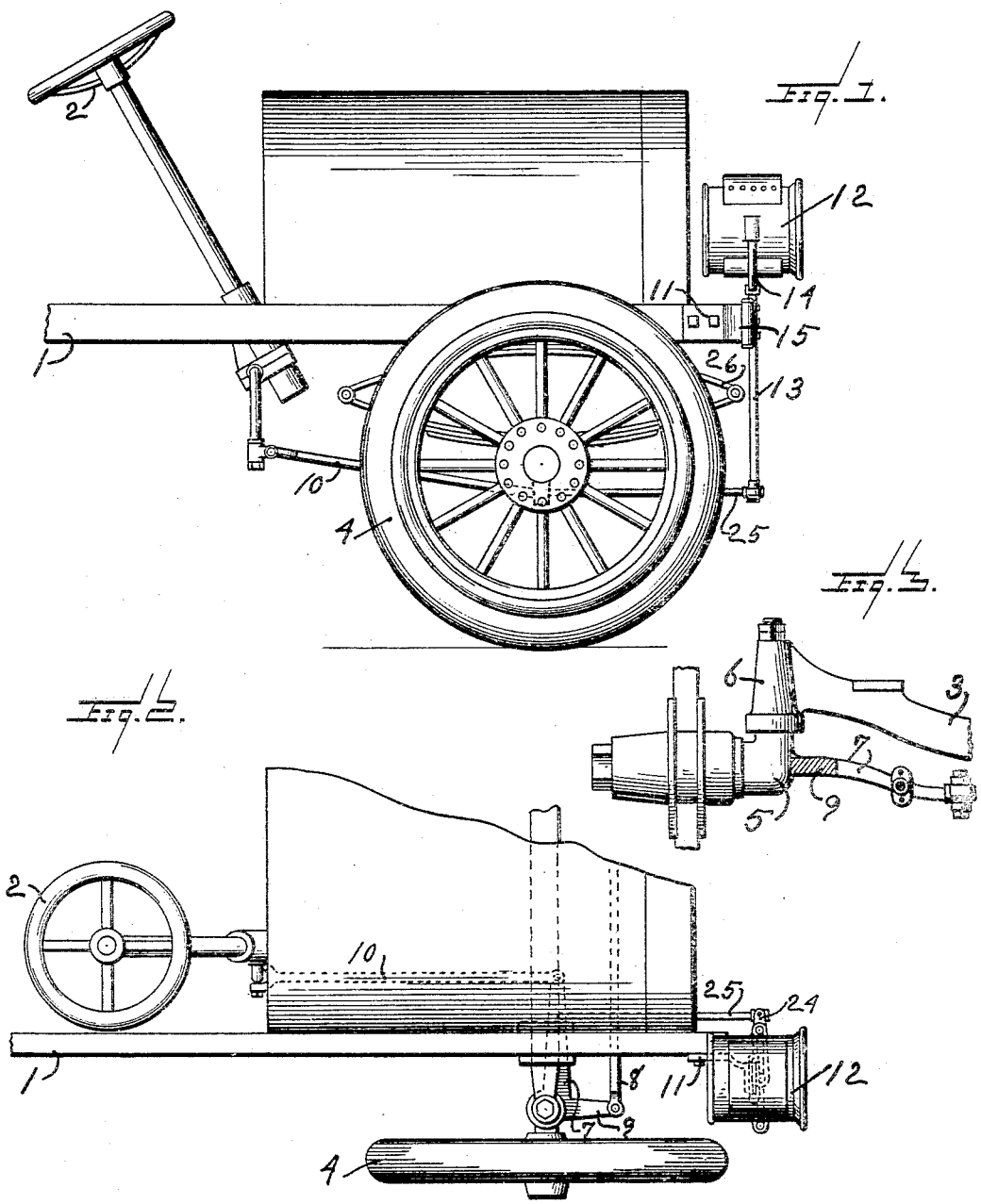

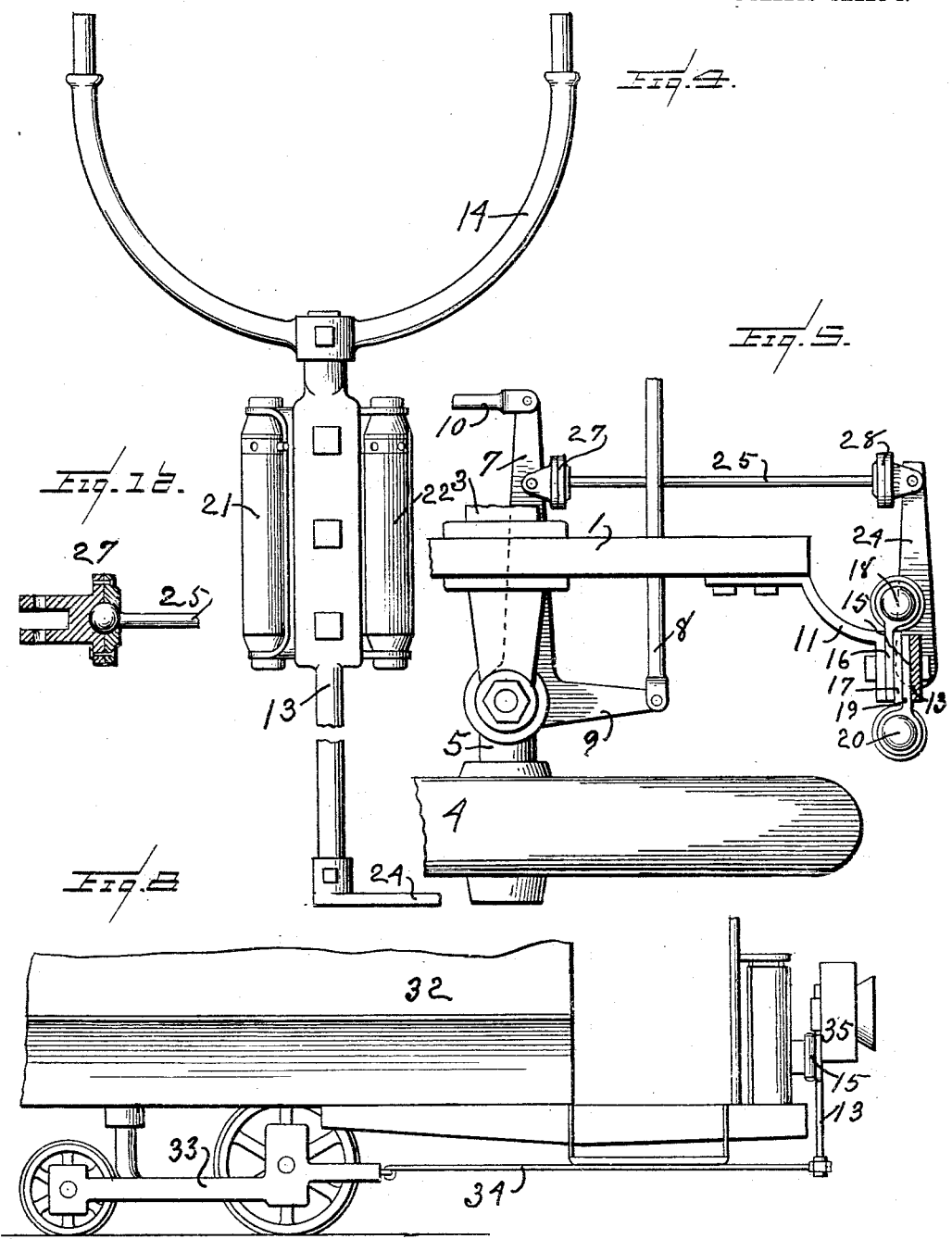

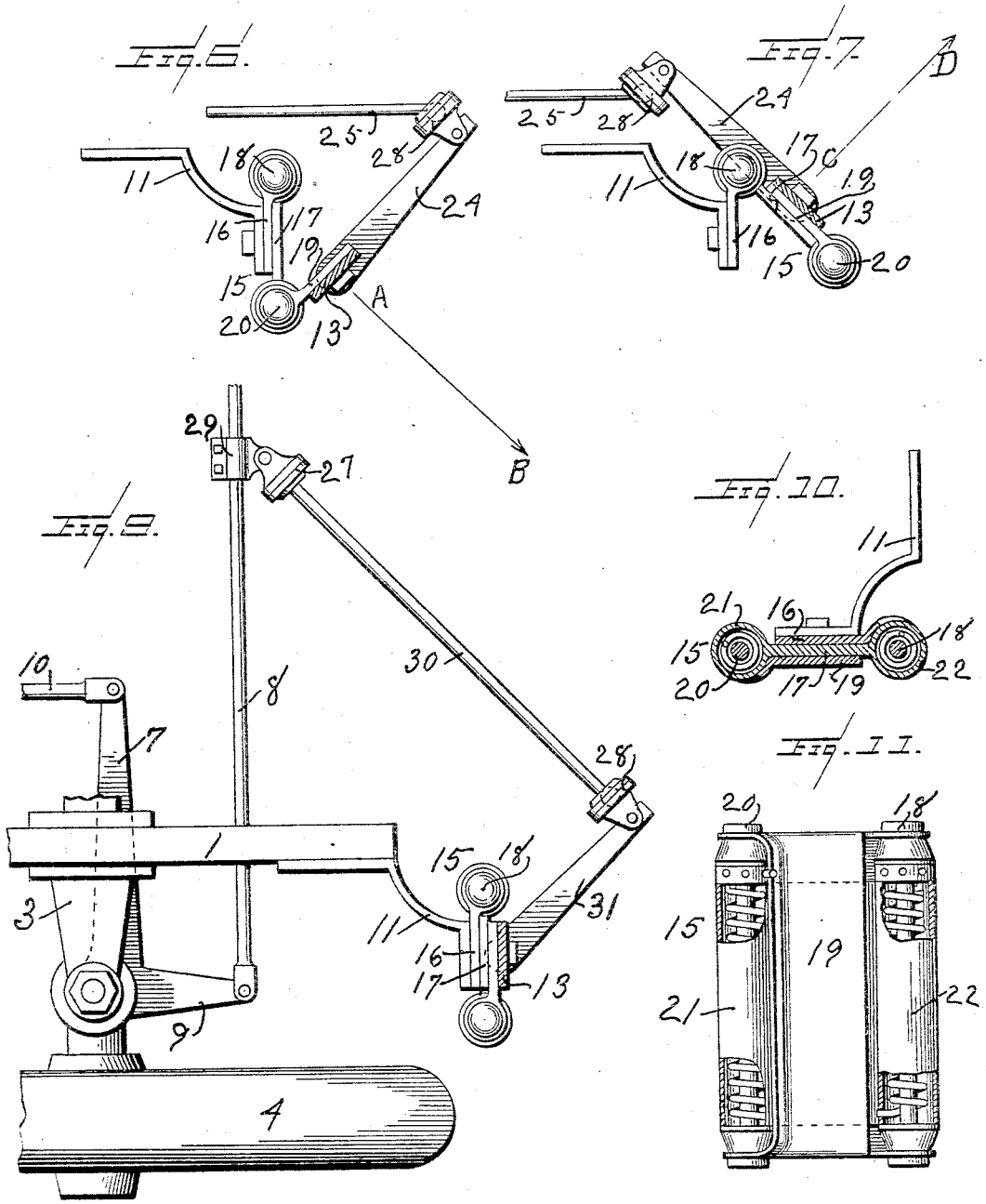

ARTEMUS R. WARFIELD AND JOSHUA B. NICHOLSON, OF WASHINGTON, DISTRICT OF COLUMBIA.

LAMP-OPERATING MECHANISM.

935,437.   Specification of Letters Patent.   Patented Sept. 28, 1909.

Application filed December 23, 1908. Serial No. 468,944.

*To all whom it may concern:*

Be it known that we, ARTEMUS R. WARFIELD and JOSHUA B. NICHOLSON, citizens of the United States, residing at Washington, in the District of Columbia, have invented certain new and useful Improvements in Lamp-Operating Mechanism, of which the following is a description, reference being had to the accompanying drawings, forming a part hereof.

Our invention relates to such forms of lamp supporting and operating mechanism for automobiles, street cars, and the like, as are designed to afford a support for the lamp and at the same time move the lamp in such a manner that the rays of light therefrom will illuminate the path to be traveled by the vehicle. This feature is of importance in traveling in a curved path, or in turning a corner, at which times it will be obvious that with lamp supporting mechanism not provided with moving means for the purpose above specified the rays of light from the lamp would be thrown straight ahead, and would confuse rather than assist the driver in judging the condition of the path which the vehicle is to follow.

Our invention relates to improvements in lamp supporting and operating mechanism of the type above set forth; and consists in improved lamp supporting mechanism designed to permit the lamp to be swung so that the light therefrom will illuminate the path to be traveled, together with means dependent upon the position assumed by the wheels of the vehicle for swinging the lamp, all as shown in the accompanying drawing, described in the following specification and claimed in the clauses of the concluding claim.

In the accompanying drawings, Figure 1 is a fragmentary view showing the forward end of an automobile with our device attached thereto, the parts being shown in elevation, Fig. 2 is a plan view of the parts shown in Fig. 1, Fig. 3 is a detail view of one form of operating connection available for swinging the lamp, Fig. 4 is an enlarged view showing the lamp supporting bracket and the support therefor, Fig. 5 is an enlarged plan view for the purpose of illustrating the operation of our device, the lamp itself and parts of the automobile not necessary to an understanding of the device being omitted, Fig. 6 is a fragmentary view illustrating a position assumed by the lamp supporting member when moved or swung from its middle position, Fig. 7 is a view illustrating the same parts in another position, Fig. 8 is a view showing our device as applied to a street car, Fig. 9 is a view showing a connection for operating the lamp differing from the connections shown in Figs. 1 to 7. Fig. 10 is a view showing a cross-section of a hinge member to be hereinafter described and which forms a part of our device; Fig. 11 is a view partly in section and partly in elevation further illustrating said hinge member, and Fig. 12 is a sectional view of a ball and socket joint employed in our device.

In the drawings, 1 is a portion of the frame of the automobile, 2 the steering wheel, 3 a portion of the front axle and 4 one of the front wheels. The front wheel 4 is supported by a stub axle 5 which is pivoted so as to swing about a vertical axis passing through a bearing 6 upon the axle 3 as is usual in automobiles, 7 is an arm formed integrally with or attached to the stub axle 5, and 10 is a rod through which motion is transmitted from the steering wheel 2 to the front wheels. 8 is a rod connected to a second arm 9 formed with or secured to the stub axle 5 and extending across the front of the machine and through which motion is transmitted to the other front wheel not shown.

The parts thus far described are common to automobiles and form no part of our invention. These or equivalent parts are also considerably modified and varied in different types of automobiles; and it will be understood that our device is applicable to automobiles irrespective of the form of steering mechanism which may be employed, and is in no way dependent upon the type of steering mechanism present in a given machine to be equipped with our invention.

11 is a bracket secured to the frame 1 of the automobile, and 12 is a lamp, two lamps being ordinarily used upon a given machine.

13 is a vertically disposed supporting member for the lamp 12 and 14 is a yoke secured to the upper end of said supporting member which yoke embraces and serves as a direct support for the lamp 12.

The supporting member 13 is supported from the frame 1 of the automobile by means of the bracket 11, and 15 is a three part hinge member interposed between the bracket 11 and the supporting member 13, the purpose of which is to permit the supporting member 13 and the lamp carried thereby to swing, to thereby project the rays of light from the lamp in the direction of travel of the machine.

The hinge member 15 is similar to and indeed may be the ordinary type of double spring hinge found upon the market and commonly used with doors designed to swing in two directions; and said hinge member comprises a leaf 16 secured to the bracket 11, a connecting leaf 17 supported by the leaf 16 and adapted to swing about a pivot at 18 whereby the leaves 16 and 17 are connected, and a leaf 19 supported by the connecting leaf 17 and adapted to swing about a pivot at 20 whereby the leaves 17 and 19 are connected.

From the above it will be understood that the lamp supporting member 13 carried by the leaf 19 of the spring member may be swung to each side of its normal middle position, and that the parts will assume extreme positions approximately as shown in Fig. 6 or 7, and that when the parts are in the position shown in Fig. 6 the rays of light will be projected in a direction indicated by the line A B, and when in the position shown in Fig. 7 in a direction indicated by the line C D; it being understood that the supporting member 13 and the lamp are carried by the leaf 19 of the spring member 15. The spring member 15 is provided with barrels 21, 22 which inclose and protect the springs forming a part of the common form of spring hinge preferably made use of, as will be understood.

The supporting member 13 is swung as above as the forward wheels are moved by the steering mechanism, the arrangement being such that when the wheels are moved to cause the vehicle to turn to the right the said support is swung so as to throw the rays of light to the right, and vice versa; to which end an arm 24 is secured to the lower end of the lamp supporting member 13, and a connecting rod or pitman 25 is provided, the ends of which are connected, respectively, with the end of the arm 24 and with the arm 7 upon the stub axle 5. Motion is, therefore, transmitted from the steering mechanism to the lamp by means of the rod 25.

As the lamp supporting member 13 is supported from the frame 1 of the automobile, and as the frame is supported from the axle through springs, as 26, it will be obvious that the vertical movements of the frame would cause the connecting rod 25 to swing about the point of its connection with the arm 7 of the stub axle 5, and would bend the rod or perhaps break the parts at the points where they are connected with one another, if means were not provided to compensate for this vertical movement. In order, therefore, to avoid the danger of breaking the parts as above stated, the connecting rod 25 is provided with a ball or other form of universal joint, or preferably with two such joints, as shown at 27, 28. With such joints it will be obvious that the frame 1 may move vertically with reference to the axle without breaking or straining the connections between the axle and the lamp supporting member.

While we have referred to the lamp supporting member 13 as deriving its motion from an arm 7 upon the stub axle 5, we would point out that said member may derive or receive its motion from any part of the steering mechanism, the only condition necessary being that the connection and arrangement be such that the lamp will be swung in unison with the movement of some part of the steering mechanism, and in a direction such that the rays of light will be projected along the path to be traveled by the vehicle.

We show in Fig. 9 one modification of the connections above described. In this figure 29 is an arm secured to the rod 8 which extends across the front of the automobile and connects the stub axles, and 30 is a connecting rod connecting said arm with an arm 31 upon the lower end of the supporting member 13, whereby said member 13 is swung the same as in the form of our device previously described. In this form of connection the arm 31 is projected forward in order that the lamp and wheel will swing in the same direction. This, however, is a matter of adjustment, and the direction taken by such arm will vary considerably, and will depend in each instance upon the type of steering mechanism found upon a machine to which our device is to be attached and upon the location and direction of motion of the part of the steering mechanism to which the operating connection for the lamp is to be attached. Our device is also applicable to street cars as indicated in Fig. 8. In this figure 32 is the body of the car, and 33 its truck. Motion is transmitted from the truck 33 through a rod 34 to a lamp 35 placed upon the front of the car; the supporting mechanism for the lamp including a three part hinge member the same as has been above described.

Having thus described our invention, and explained the mode of operation thereof, we claim as new and desire to secure by Letters Patent:—

1. In a device of the class described, a lamp supporting member; a bracket; a three part hinge member interposed between said bracket and said lamp supporting member, two of the parts of said hinge member being secured, respectively, to said lamp supporting member and to said bracket, and the third part of said hinge member forming a connection between, and to which each of said first mentioned parts are pivoted at points apart from one another; means for swinging said lamp supporting member; and a spring coöperating with said hinge member and acting in opposition to the motion transmitted to said lamp supporting member.

2. In a device of the class described, a bracket adapted to be secured to an automobile or similar vehicle; a hinge member secured to said bracket; a lamp supporting member; a hinge member secured to said lamp supporting member, a connecting member interposed between and serving to connect said two first mentioned hinge members and pivoted to each, the arrangement of the parts being such that said two first mentioned hinge members will lie upon either side of and extend parallel with said connecting member when the parts are in their normal position; two springs, one acting upon each of said two first mentioned hinge members to maintain them in closed condition parallel with said connecting member; and means for swinging said lamp supporting member about the pivots of said hinge mechanism.

3. In an automobile or similar vehicle, a frame; a bracket secured to said frame; a lamp supporting member; an arm secured to the lower end of said lamp supporting member; a three-part hinge member interposed between said bracket and said lamp supporting member, two of the parts of said hinge member being secured, respectively, to said lamp supporting member and to said bracket, and the third part of said hinge member forming a connection between, and to which each of said first mentioned parts are pivoted at points apart from one another; a spring coöperating with said hinge member and acting in opposition to the motion transmitted to said lamp supporting member; and a rod connecting an element of the steering mechanism of the automobile with the arm upon the lower end of said lamp supporting member and through which the lamp supporting member may be swung to each side of its normal central position.

4. In an automobile or similar vehicle, a frame; a bracket secured to said frame; a hinge member secured to said bracket; a lamp supporting member; a hinge member secured to said lamp supporting member; an arm secured to the lower end of said lamp supporting member; a connecting member interposed between and serving to connect said hinge members and pivoted to each, the arrangement of the parts being such that said two first mentioned hinge members will lie upon either side of and extend parallel with said connecting member when the parts are in their normal position; two springs, one acting upon each of said two first mentioned hinge members to maintain them in closed condition parallel with said connecting member; steering mechanism for said automobile; and a rod connecting an element of said steering mechanism with the arm upon the lower end of said lamp supporting member and through which the lamp supporting member may be swung to each side of its normal central position.

5. In an automobile or similar vehicle, a frame; a bracket secured to said frame; a hinge member secured to said bracket; a lamp supporting member; a hinge member secured to said lamp supporting member; an arm secured to the lower end of said lamp supporting member; a connecting member interposed between and serving to connect said hinge members and pivoted to each, the arrangement of the parts being such that said two first mentioned hinge members will lie upon either side of and extend parallel with said connecting member when the parts are in their normal position; two springs, one acting upon each of said two first mentioned hinge members to maintain them in closed condition parallel with said connecting member; steering mechanism for said automobile including a stub axle; an arm secured to said stub axle; an operating member connecting said arm with the arm upon the lower end of said lamp supporting member and through which the lamp supporting member may be swung to each side of its normal central position; and a plurality of universal joints included in said operating member.

6. In an automobile or similar vehicle, a frame; a bracket secured to said frame; a lamp supporting member; an arm secured to the lower end of said lamp supporting member; a three-part hinge member interposed between said bracket and said lamp supporting member, two of the parts of said hinge member being secured, respectively, to said lamp supporting member and to said bracket, and the third part of said hinge member forming a connection between, and to which each of said first mentioned parts are pivoted at points apart from one another; a spring coöperating with said hinge member and acting in opposition to the motion transmitted to said lamp supporting member; steering mechanism for said automobile including a stub axle; an arm secured to said stub axle; and a rod connecting said arm with the arm upon the lower end of said lamp supporting member and through which the lamp supporting member may be swung to each side of its normal central position.

This specification signed and witnessed this nineteenth day of December, A. D. 1908.

ARTEMUS R. WARFIELD.
JOSHUA B. NICHOLSON.

In the presence of—
E. H. PARKINS,
R. N. FLINT.